US009799026B1

(12) United States Patent
Allen et al.

(10) Patent No.: US 9,799,026 B1
(45) Date of Patent: Oct. 24, 2017

(54) DIRECT PAYMENT METHOD USING GATEWAY EXCEPTION HANDLING

(71) Applicant: Supersede Solutions, LLC, Richardson, TX (US)

(72) Inventors: Robert M. Allen, Richardson, TX (US); Richard Taylor, Richardson, TX (US)

(73) Assignee: Supersede Solutions, LLC, Plano, TX (US)

( * ) Notice: Subject to any disclaimer, the term of this patent is extended or adjusted under 35 U.S.C. 154(b) by 0 days.

(21) Appl. No.: 14/573,113

(22) Filed: Dec. 17, 2014

(51) Int. Cl.
G06Q 40/00 (2012.01)
G06Q 20/34 (2012.01)
G06Q 20/02 (2012.01)
G06Q 20/38 (2012.01)

(52) U.S. Cl.
CPC ......... *G06Q 20/351* (2013.01); *G06Q 20/027* (2013.01); *G06Q 20/38* (2013.01)

(58) Field of Classification Search
CPC .. G06Q 20/351; G06Q 20/40; G06Q 20/3674; G06Q 20/405; G06Q 20/409
See application file for complete search history.

(56) References Cited

U.S. PATENT DOCUMENTS

| | | | |
|---|---|---|---|
| 5,590,196 A | 12/1996 | Moreau | |
| 5,677,955 A | 10/1997 | Doggett et al. | |
| 5,832,460 A | 11/1998 | Bednar et al. | |
| 5,890,129 A | 3/1999 | Spurgeon | |
| 5,991,750 A | 11/1999 | Watson | |
| 6,003,007 A | 12/1999 | DiRienzo | |
| 7,380,707 B1 | 6/2008 | Fredman | |
| 7,752,134 B2 | 7/2010 | Spear | |
| 7,792,686 B2 | 9/2010 | Allen | |
| 8,204,766 B2 | 6/2012 | Bush | |
| 8,249,893 B1 | 8/2012 | Allen | |
| RE43,904 E | 1/2013 | Allen | |
| RE44,748 E | 2/2014 | Allen | |

(Continued)

FOREIGN PATENT DOCUMENTS

EP 1049056 11/2000

OTHER PUBLICATIONS

LeRoy H. Graw, Purchasing Credit Cards Introduction, www.ipscmi.org/tipsandsolutions/purchasingcredit.php (retrieved from Aug. 19, 2006 archive at https://web.archive.org/web/20060819120418/www.ipscmi.org/tipsandsolutions/purchasingcredit.php) ("vPayment Interview").

(Continued)

*Primary Examiner* — Kirsten Apple
*Assistant Examiner* — Michael W Anderson
(74) *Attorney, Agent, or Firm* — Anton J. Hopen; Andriy Lytvyn; Smith & Hopen, P.A.

(57) ABSTRACT

A system and method for straight through payment processing when the merchant is known but the merchant's payment card acquirer is unknown. Payment instructions from a payee to the merchant are normalized for a target acquirer system which is selected either at random, based on business logic and data, or based on successful past straight through payments. Payments are attempted for each acquirer successively until a successful payment notification is received. The link to the merchant and acquirer is then saved for subsequent straight through payments to that merchant.

14 Claims, 5 Drawing Sheets

(56) References Cited

U.S. PATENT DOCUMENTS

| | | | |
|---|---|---|---|
| 2001/0034618 | A1 | 10/2001 | Kessler et al. |
| 2002/0194027 | A1 | 12/2002 | Smith |
| 2004/0249745 | A1 | 12/2004 | Baaren |
| 2005/0033604 | A1 | 2/2005 | Hogan |
| 2005/0209964 | A1 | 9/2005 | Allen et al. |
| 2005/0261944 | A1 | 11/2005 | Rosenberger |
| 2006/0010016 | A1 | 1/2006 | Kossol et al. |
| 2007/0005402 | A1 | 1/2007 | Kennedy et al. |
| 2007/0005403 | A1 | 1/2007 | Kennedy et al. |
| 2007/0282743 | A1* | 12/2007 | Lovelett ............... G06Q 20/10 705/40 |
| 2009/0222353 | A1 | 9/2009 | Guest et al. |
| 2014/0089183 | A1* | 3/2014 | Allen ................. G06Q 20/24 705/41 |
| 2014/0214651 | A1* | 7/2014 | Prasadh ............. G06Q 20/027 705/39 |

OTHER PUBLICATIONS

"AP vPayment XML Supplier Training", GE Corporate Payment Services, dated Jan. 26, 2005.

Visa Commercial Solutions: Merchant Category Codes for IRS Form 1099-MISC Reporting, Visa U.S.A. Inc., 2004.

GE Pre-Authorization SystemTM, http://www.gebusiness marketplace.com/int_preauth.htm (retrieved from Aug. 12, 2003 archive at https://web.archive.org/web/20030812180305/http://www.gebusinessmarketplace.com/int_preauth.htm) ("GE Pre-Authorization").

How vPayment Works, http://www.gebusinessmarketplace.com/int_vpayment2.htm (retrieved from Oct. 10, 2003 archive at https://web.archive.org/web/20031010171903/http://www.gebusinessmarketplace.com/int_vpayment2.htm) ("How vPayment Works").

Viewpointe and Payformance Collaborate to Provide Image Statement Products, http://www.payformance.com/contactus/press/ViewpointePayformanceIS.pdf (dated Sep. 30, 2002; retrieved from Mar. 22, 2006 archive at https://web.archive.org/web/20060322175410/http://www.payformance.com/contactus/press/ViewpointePayformanceIS.pdf) ("Image Statement Products").

Health Care Claim Payment/Advice 835 electronic Data Interchange Transaction Set Implementation Guide, Mar. 2003, Washington Publishing Corporation ("835 Implementation Guide").

Thrifty Revolutionizes Electronic Commission Payments to Travel Agents, Jul. 9, 1996, PR Newswire ("Thrifty Comission Payments").

National Processing Co. Activates Pay-Tracking Site, Jun. 15, 1999, Travel Weekly ("NPC Pay-Tracking").

NPC Offers Currency Conversion of Travel Commissions with the Launch of NPC Global Payment Network Free Currency Conversion for Travel Agency Commissions from Vendors, Oct. 16, 1998, www.hospitalitynet.org ("NPC Offers Currency Conversion").

Health Alliance Medical Plans, Inc. Selects National Processing Company for Complete Electronic Settlement Solution: NPC's AcceleratedPay(SM) to Provide Automation of Payment and Settlement Functions, Dec. 6, 2001, PR Newswire ("Health Alliance Selects NPC").

Humana Announces Emphesys and New Wave of Services to Expand Consumer and Physician Control of Health Decisions: New Technology and Consumer-Centric Programs Combine to Increase Choice, Nov. 29, 2001, PR Newswire ("Humana Announces Emphesys").

Blue Cross and Blue Shield Association and Payformance Corporation Sign National Agreement, Nov. 30, 2004, Business Wire ("BCBSA and Payformance Sign National Agreement").

National Processing Company to Support HealthLink Electronic Payment Processing, Jul. 1, 2003, National Processing, Inc. Press Release ("NPC to Support HealthLinK").

District Court's Order responsive to Motion for Summary Judgment in C.A. No. 8:13-cv-2240-T-33MAP pp. 1-30.

\* cited by examiner

DIRECT PAYMENT METHOD USING GATEWAY EXCEPTION HANDLING

BACKGROUND OF THE INVENTION

1. Field of the Invention

This invention relates to facilitating payments by a third party. More specifically, it relates to directly submitting payment to a merchant (such as a doctor's office) by payment card wherein the merchant does not need to run the payment card information through their card terminal or point-of-sale system.

2. Brief Description of the Related Art

Third party administrators, insurance companies, and large self-funded corporations (herein "Payers") adjudicate claims, compare them to a benefit plan and make the decision to write checks in payment for the claims. Currently, Payers are required to print checks and explanation of benefit (EOB) forms for delivery to the health care providers. The EOB lists the amount the health care provider billed the Payer's company and the amount the Payer's company paid on the claim. It may also list the contractual discount amount and the patient responsibility. If the claim is denied, the EOB will explain the reason for denial.

In an effort to streamline this process, Applicant developed a process described in U.S. Pat. No. 7,792,686 (reissued as RE44748 and RE43904), the specification of which is incorporated herein by reference. The '686 patent discloses a method to deploy a payment card to pay medical service claims. Since there is a one-to-one relationship between the payment card and the specific claim, reconciling the payment is made substantially more efficient. However, the method still requires the medical service provider (typically the bookkeeper) to receive the stored value card information including the expiration date, account number, payment amount, verification codes and the like and repeatedly input the information as a card-not-present transaction through the credit card terminal. The transaction must then be authorized, cleared and settled before the service provider receives its funds.

U.S. Pat. No. 8,249,893 streamlined this process going forward by capturing certain data values in the initial process and then utilized them to implement a direct push-through payment or straight-through payment (STP) to the service provider's merchant account. The service provider does not need to perform the administrative tasks of running a card payment transmitted by the payer. Rather, the service provider is simply "paid" receiving an authorization confirmation of the completed financial transaction and an explanation of benefits detailing how the funds were applied.

However, to implement a direct push-through payment to the service provider's merchant account it is necessary to know the identity of the acquirer (or payment card processor). An acquirer is a bank or financial organization that processes credit and/or debit card payments for products or services for a merchant. In some cases the link between the service provider's merchant account and the associated acquirer may be readily available but to implement a robust payment system the ability to implement the direct push-through payment must be available even when the specific identity of the acquirer (processor) is unknown.

However, in view of the art considered as a whole at the time the present invention was made, it was not obvious to those of ordinary skill in the field of this invention how the shortcomings of the prior art could be overcome.

BRIEF SUMMARY OF THE INVENTION

The present invention is a service based technology that provides straight-through card processing technology (also known as "push" or "buyer-initiated" payments). The technology moves money in a B2B (business-to-business) environment, typically from a payer to a merchant. The mechanism for moving money is a virtual prepaid, debit or credit card.

The potential utility of this invention is significant. In the United States alone, there have been millions of checks mailed between businesses in the last few years, representing payments totaling trillions of dollars. Based on the growing use and acceptance of virtual cards for B2B payments in a variety of industries (e.g., travel, insurance, warranty), the present inventors have focused on how to make a virtual card more attractive to accept by the merchant. At the same time, the payment becomes easier to deliver by the payer and there are no PCI (security) issues associated with the delivery of the transaction (as opposed to mailing, emailing or faxing a virtual card to a merchant that must manually input into a terminal).

Once certain data about a merchant is obtained (discussed more below), a straight-through payment ("STP") requires no action by the merchant. The merchant simply receives the payment as a direct deposit into its merchant bank account.

The present invention uses a gateway to connect to all acquiring processors in the United States, thus enabling the payment via virtual card to any merchant. A "white label" database is maintained, which houses information about individual transactions and ancillary data (e.g., tax ID, merchant ID, terminal ID) for each merchant on file. The database of merchant data is populated so that each merchant is able to receive a STP. The collection of merchant data for that database is collected from three primary sources: (1) an enrollment form filled out by the merchant (formal enrollment) providing necessary acquiring processor and related data (traditional method); (2) Authorizing processor-captured data following the authorization of a payment card transaction initiated by the merchant (U.S. Pat. No. 8,249,893, RE44748 and RE43904); and (3) specifically designed trial and error submissions that verify a certain processing platform is correct for a specific merchant and that all data elements are present and accounted for, including settlement methodology.

An advantage to the present invention is that less card payment information is transmitted between payer and service provider thereby lowering security risk and potential fraud. For example, no PANs are circulated via fax or mail to merchants and virtual payment cards can be tokenized and card vaulted for repeat transactions.

Another advantage of the present invention is that direct payment reduces the administrative burden put on the service provider to process payments. For example, there is no terminal input. This is helpful for merchants receiving multiple virtual payment card transactions in a short period of time.

Yet another advantage is that no enrollment (formal registration) of the merchant is necessary.

Yet another advantage is that no separate virtual terminal is required to receive a STP only (i.e., the STP will appear embedded in the same settlement report as the merchant's other credit/debit card transactions).

Yet another advantage of the present invention is that the service provider is paid faster.

Yet another advantage of the present invention is a potentially lower interchange rate because the eliminated risk of processing a "card-not-present" in subsequent transactions.

Yet another advantage of the present invention is potentially increasing or decreasing interchange rates by controlling the amount of data added to the transaction. The amount of data added to or removed from the transaction sent to the acquiring processor can determine the data rate achieved and drive the interchange up or down.

Yet another advantage of the present invention is that no sign-up or enrollment is required by the service provider. The necessary data is automatically captured and utilized for subsequent direct payments.

BRIEF DESCRIPTION OF THE DRAWINGS

For a fuller understanding of the invention, reference should be made to the following detailed description, taken in connection with the accompanying drawings, in which.

DETAILED DESCRIPTION

Figure 1:
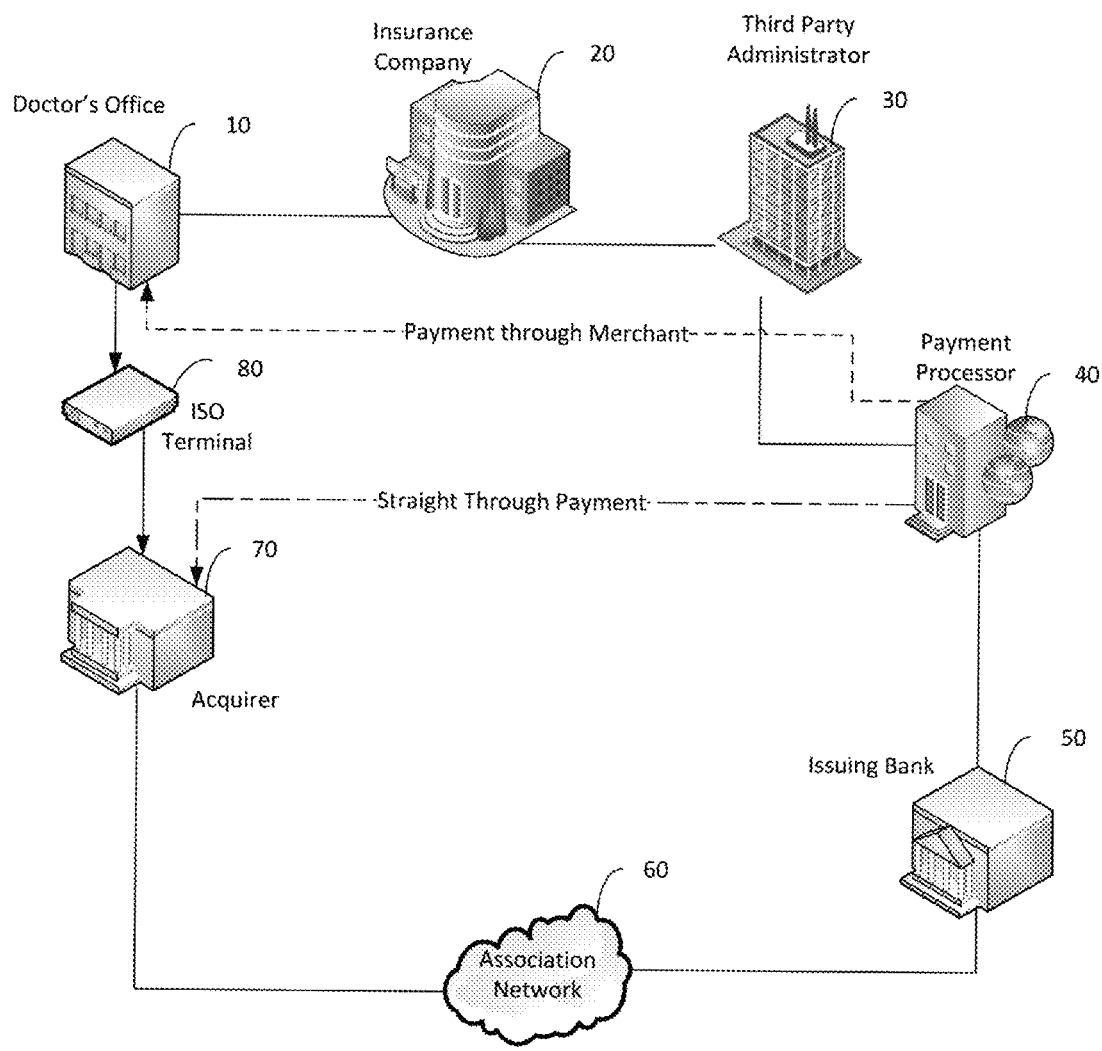
FIG. 1 is a diagrammatic view of an embodiment of the invention showing various payment pathways.

FIG. 1 shows an embodiment of the invention applied to health care service payments. It should be noted that the scope of this invention is not limited to this industry and Doctor's Office 10 can be any merchant submitting a request for payment. In this embodiment, Doctor's Office 10 submits a request for payment to Insurance Company 20. Insurance Company 20 passes this request for payment onto Third Party Administrator 30 which adjudicates the claim made by Doctor's Office 10 according to the relevant terms of Insurance Company 20 and the covered entity (e.g., the patient).

Third Party Administrator 30 now has a responsibility to send two items back to Doctor's Office 10: (1) payment for the covered services (if any); and (2) remittance advice which explains what services were covered for payment and what services are denied payment (also known as an "explanation of benefits" or EOB or yet alternatively "explanation of payment" or EOP). This stage has typically been the most inefficient part of the process. Millions of checks have traditionally been mailed back to service providers which cost paper, envelopes, printing and postage.

This process was made substantially more efficient by the process described in U.S. Pat. No. 7,792,686 (reissued as RE44748 and RE43904). These patents describe methods to effect payment to Doctor's Office 10 by a virtual payment card obtained from Issuing Bank 50. The virtual payment card (or simply its data) is sent substantially concurrent with the remittance advice to Doctor's Office 10. The virtual payment data is then processed through ISO Terminal 80 which then goes to Acquirer 70 which effectively pays Doctor's Office 10. The transaction is processed through Association Network 60 for payment through an interchange and settlement system. Issuing Bank 50 pays Acquirer 70.

A drawback to this system is that Doctor's Office 10 still had to process the payment card data to complete the transaction. U.S. Pat. No. 8,249,893 advanced this process by capturing data in a first payment card transaction to merchant. The captured data included merchant ID and terminal ID. For subsequent payments to the same merchant, the data was used to make a straight through payment (STP) direct to Acquirer 70. All that the Doctor's Office 10 needed was the remittance advice because they were already "paid." A benefit of this technology was that no payment card data need be sent to Doctor's Office 10 which made the transaction more secure. Yet another benefit was that it incurred less administrative work for Doctor's Office 10 (e.g., no punching in payment card data into a credit card terminal).

However, the present inventors determined there was yet another way to improve this process even more. What if a first transaction according to the '893 patent wasn't even needed? What if payment could be made directly to an acquirer without having to have captured data from a traditional virtual payment card transaction? The initial challenges were significant. The acquirers operating in the United States do not subscribe to a universal format for receiving a payment request. Furthermore, the link between a merchant (e.g., Doctor's Office 10) and its acquirer was not generally accessible to third parties.

Figure 2:
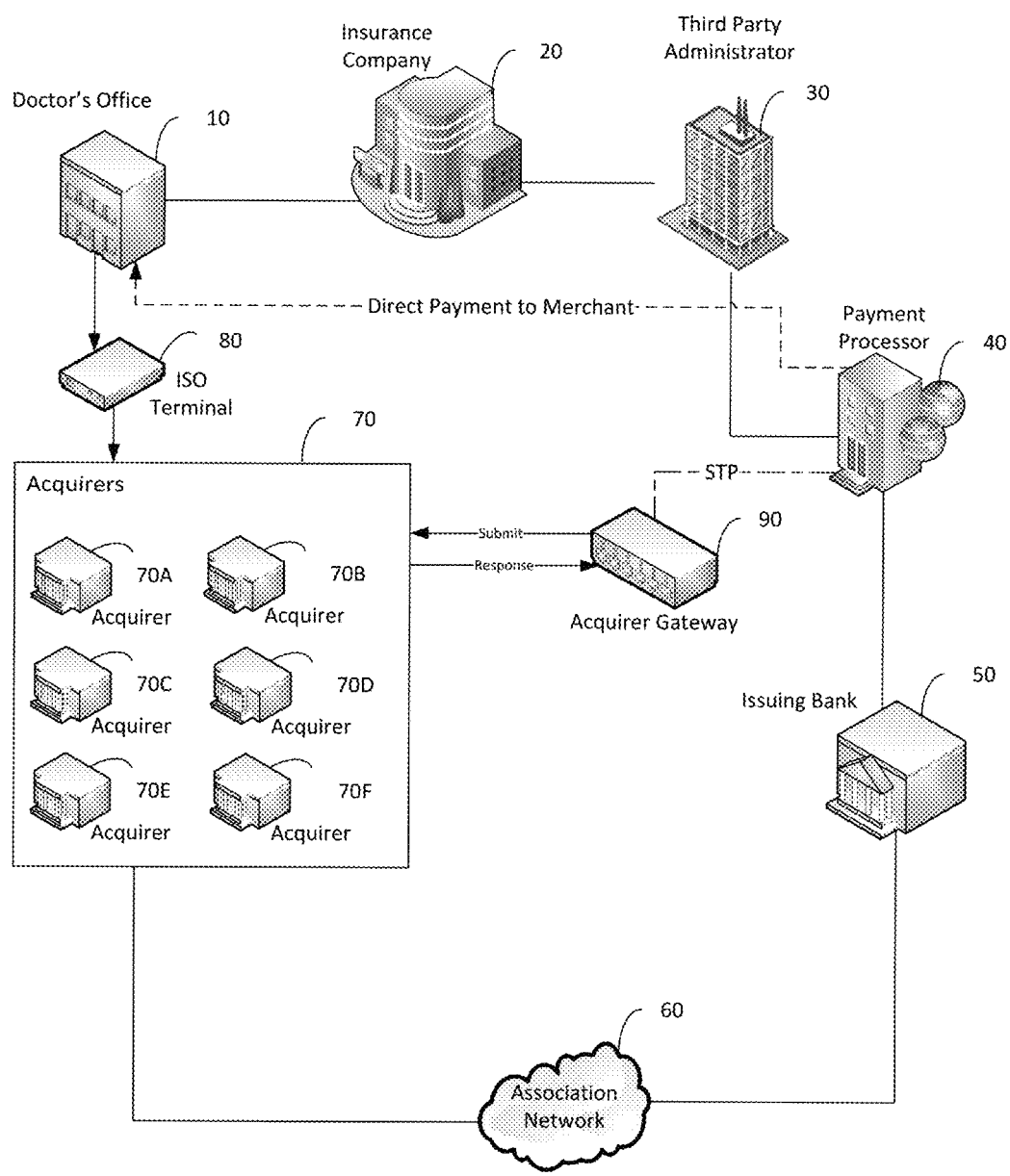
FIG. 2 is a diagrammatic view an embodiment of the invention showing exception handling by the acquirer gateway.

FIG. 2 shows an embodiment of the invention that utilizes an acquirer gateway. When the term "acquirer" is used it should be noted that both the card processor for the acquiring bank (bank sponsor) is referenced. The processor is the entity that switches out the transaction, whereby the acquiring bank is actually a bank sponsor and the one that enters into an agreement with the merchant. For example, BANK OF AMERICA would enter into an agreement with the merchant, but FIRST DATA would be the processor. In all cases of targeting an acquirer according to the invention both a processor and an acquiring bank exist. Referencing FIG. 2, Payment Processor 40 knows the merchant ID and possibly the ISO Terminal 80 identification for Doctor's Office 10. However, linking this information requires otherwise unavailable data from Association Network 60. A finite number of acquirers (70A-F) exist as possible processors for a straight through payment. Acquirer Gateway 90 either at random or by business logic and data targets an acquirer in the collection 70A-F in sequence, attempting to make the straight through payment. If the wrong acquirer is selected, an exception will occur and Acquirer Gateway 90 receives a response indicating the wrong acquirer was selected.

There are approximately 20 different data elements required to process a transaction, but not all processors require the same elements. There are several idiosyncrasies associated with each particular processor (e.g., GLOBAL PAYMENTS requires a Bank Number and HEARTLAND requires a Terminal Number) and the overall mapping exercise is quite difficult because there is no universal standard for creating a gateway account. The present invention connects to 25 domestic processors, each requiring its own unique mapping schema.

For an individual merchant, many of the data elements can be created by the acquirer gateway 90 or a communicatively coupled system (e.g., settlement time) but there are exact elements (e.g., Merchant ID and Terminal ID) that are required. These can be found in the XXX file (e.g., the "network settlement file") that the issuer receives following the initial transaction following U.S. Pat. No. 8,249,893, with one exception. The merchant number is in this file but the name of the processor is not. The matching of the merchant number with the processor name can only be accomplished through Association cooperation. With the XXX file that is provided to the issuer, all data elements can now all be accounted for.

Separately, the settlement method must be determined for each merchant. Host capture refers to the processor host "holding" the transaction waiting for an event to happen before settling. Terminal capture refers to the "Point of Sale" holding the transaction until releasing it for settlement. There are three types of host capture: (1) processor settles the transaction automatically at a time set by the processor; (2) processor settles the transaction automatically at a time set by the merchant; and (3) processor settles the transaction only after the transaction is released. There is one type of terminal capture and for that the entire transaction must be submitted in a batch for settlement. As a gateway, the invention can only control the settlement time for host capture with release and terminal capture. Each processor has unique abilities to support settlement methodologies. Some processors (e.g. CHASE PAYMENTECH) support all host capture scenarios and terminal capture, yet other processors (e.g. WORLDPAY) only support one methodology (processor settles the transaction automatically at a time set by the processor.)

Figure 3:
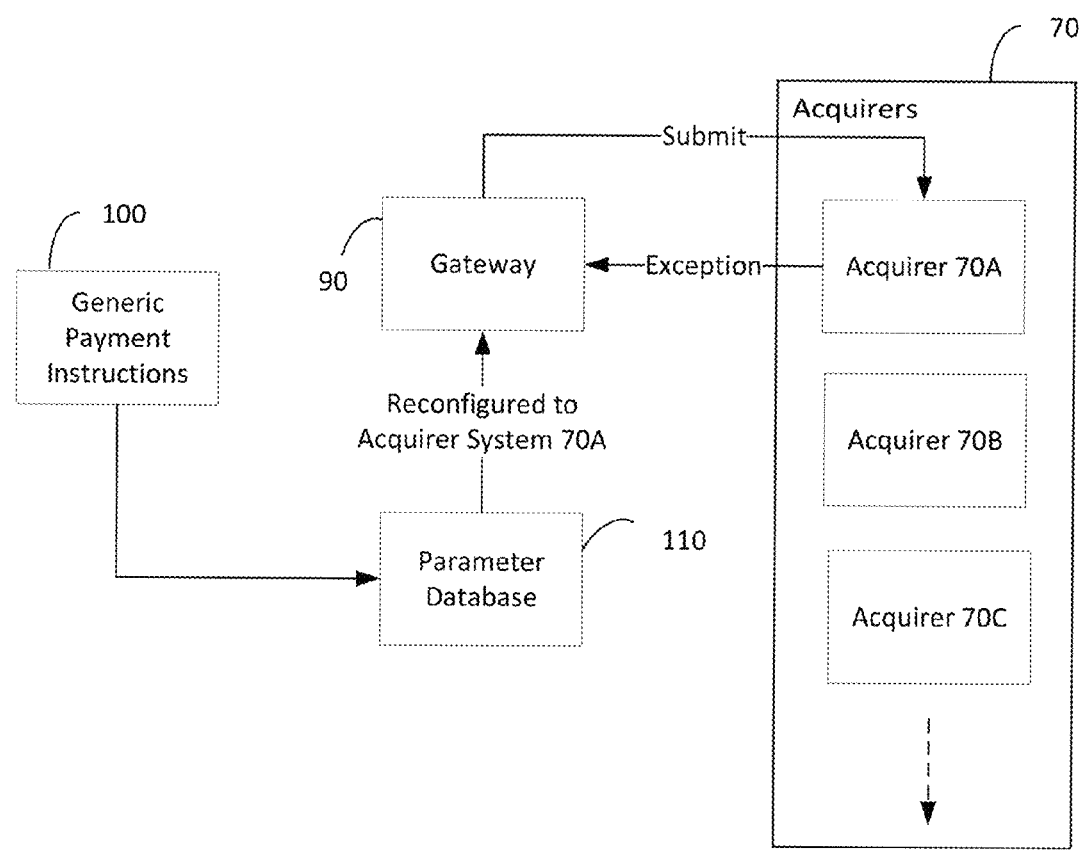
FIG. 3 is a diagrammatic view of an embodiment of the invention resulting in an exception.

FIG. 3 is a diagrammatic view of an embodiment of the invention wherein generic payment instructions 100 are received and processed through a parameter database 110 for a particular acquirer. In the example of FIG. 3, the payment instructions are reconfigured for acquirer system 70A. These reconfigured instructions are passed through gateway 90 to Acquirer 70A. In this example, an exception is returned to gateway 90 indicating that the payment was not successful.

Figure 4:
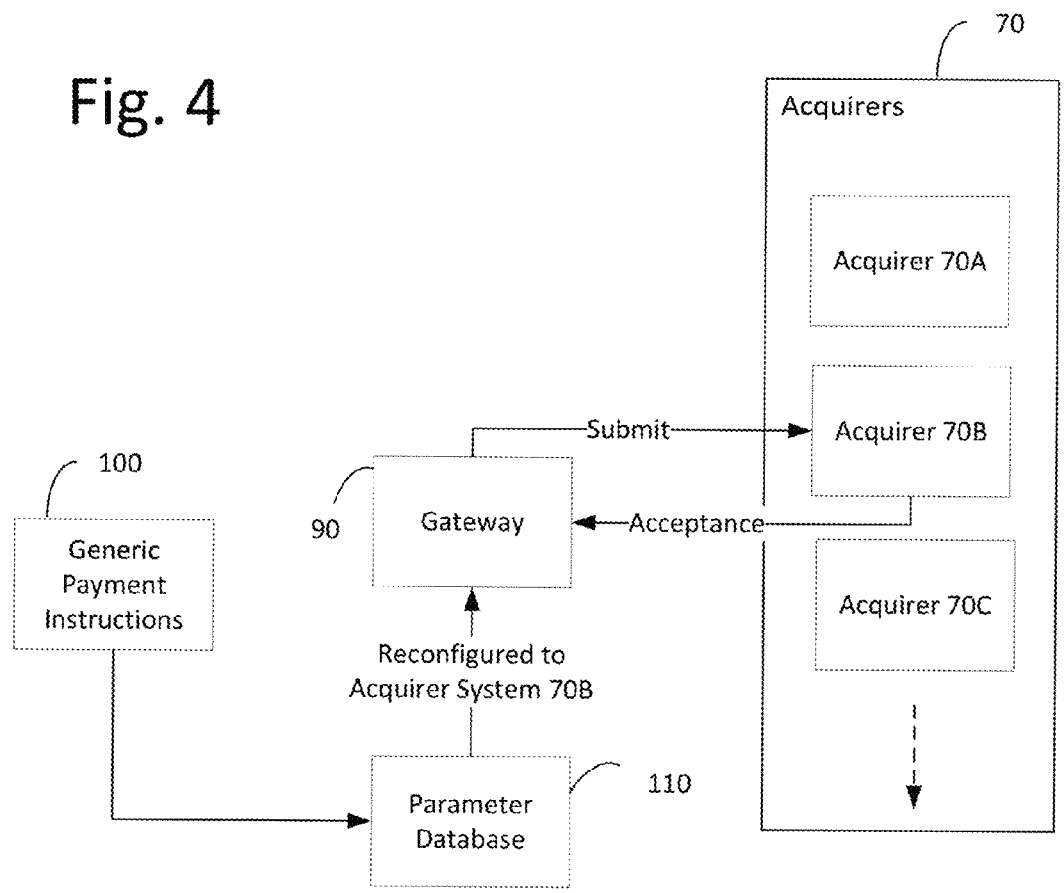
FIG. 4 is a diagrammatic view of an embodiment of the invention resulting in a successful straight through payment.

FIG. 4 is a continuation of the process from FIG. 3. Now that Acquirer 70A has been eliminated as a possibility for the merchant, the generic payment instructions 100 pass again through parameter database 110 which reconfigures them to Acquirer System 70B. This is submitted through Gateway 90 to Acquirer 70B. This time, the payment is accepted and an acquirer-merchant database is populated with the successful relationship between merchant and Acquirer 70B. The next time this merchant is paid, the system will automatically start with Acquirer 70B.

Figure 5:
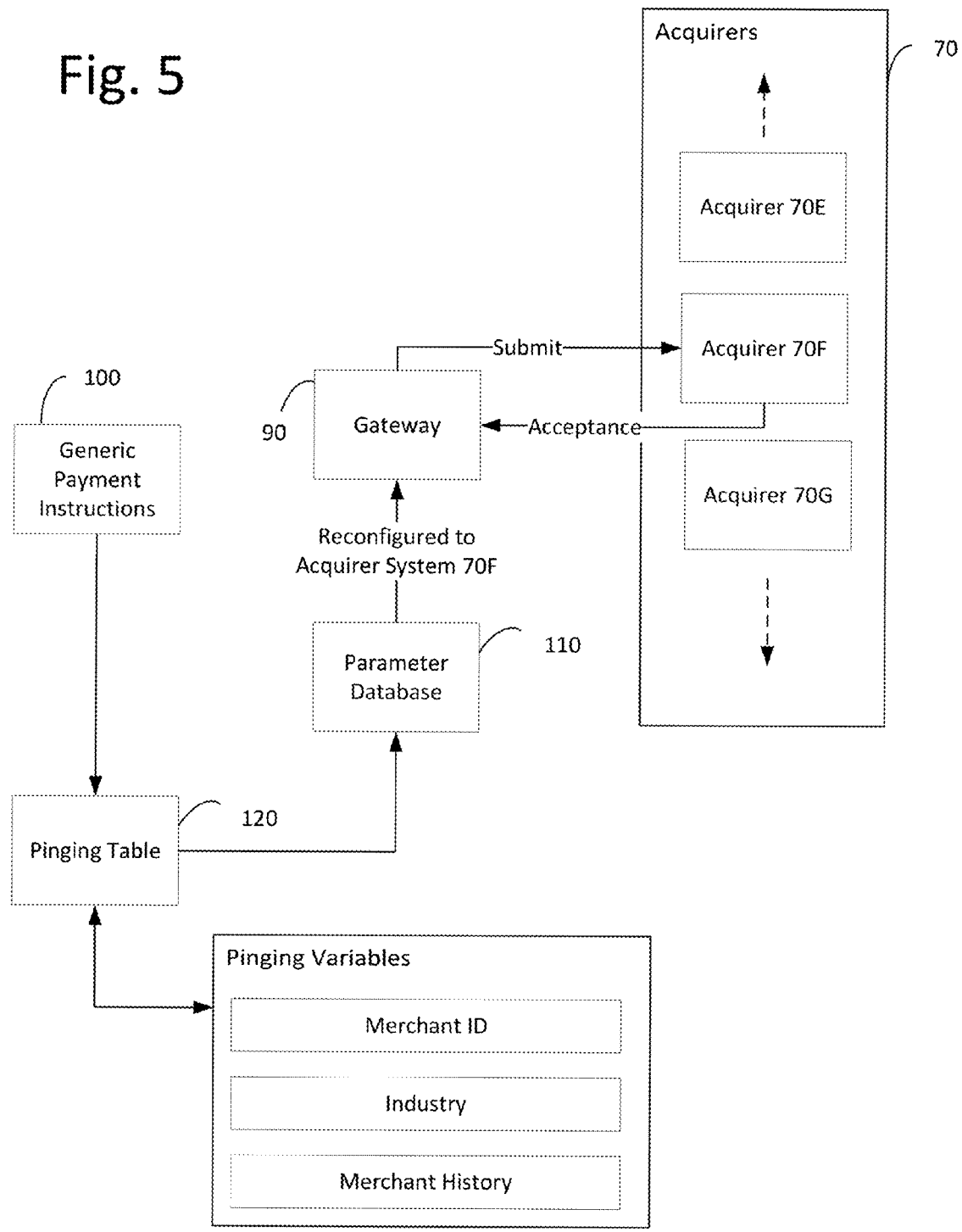
FIG. 5 is a diagrammatic view of an alternative embodiment of the invention using a pinging table to prioritize which acquirers to try first.

FIGS. 3-4 may be implemented on a random basis. But an alternative embodiment of the invention is shown in FIG. 5 which includes pinging table 120. Using business logic applied to additional data such as merchant ID, industry and/or merchant history, pinging table prioritizes the most likely target acquiring systems. (e.g., if a merchant number starts with a "43," it is most likely a FIRST DATA OMAHA merchant). In the example of FIG. 5, pinging table 120 determines the most likely acquirer is Acquirer 70F which is targeted and returns a successful result, accepting payment for the merchant.

The present invention populates an intelligence gathering system to add the settlement methodology required to the merchant record in an acquirer-merchant database. The methodology must match the set-up parameter is most cases to submit a successful straight thru transaction.

The present invention is an automated system to electronically gather the necessary data and merge that data to create a merchant gateway account. Once the gateway account is built, the payment card for that merchant may be vaulted. All of the pieces are in place to process subsequent transactions for that unique merchant.

HARDWARE AND SOFTWARE INFRASTRUCTURE EXAMPLES

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

GLOSSARY OF TERMS

Acquirer: a bank or financial organization that processes credit and/or debit card payments for products or services for a merchant. Also called an acquiring bank, merchant bank or sponsor bank.

Authorization: is a process by which a transaction is approved by the issuer of by the card network on behalf of the issuer. Permission is given or denied via the acquirer to accept a specific transaction from the cardholder account. The authorization indicates the card is valid and that sufficient funds are available for payment of the requested amount.

Authorization Approval Code: is a numerical code assigned to a sales transaction indicating that the sale is authorized.

AVS: is address verification services. AVS uses the billing information associated with a card to verify the cardholder's address.

Bank Account Information: information used to identify a specific bank account. This information can include routing numbers, account data, account numbers and other information used to identify a bank account.

BIN: is a six-digit Bank Identification Number assigned to each federally insured financial institution for the routing of transactions and other purposes. It is also known as an Issuer Identification Number (IIN) the first digit of which is the Major Industry Identifier (MII).

Card Association: a collective network of both the card network and the banks that issue cards operable on the network's infrastructure.

Card Network: financial networks that administer the credit and debit card processing. These networks include those known by the brands VISA, MASTERCARD, AMERICAN EXPRESS, DISCOVER, DINER'S CLUB, and JCB.

Card Verification Code (CVV): is numeric security code that provides extra security against unauthorized use during non-face to face transactions. CVV codes are three-digit numbers on the back of VISA and MASTERCARD credit and debit cards. The CVV number helps guard against the use of data stolen from payment networks by hackers. Intercepted data will usually comprise the cardholder name, card number and card expiration date, but not the CVV, which is generally obtained only by viewing the physical card.

CNP Transaction: is a "card not present" transaction such as payments taken over the Internet or by phone or mail.

Computer Based Server: a computer hardware system dedicated to running one or more services. Services can vary from database server, file server, mail server, print server, web server, or various other types services achieved through a computer program.

Computing Device: a computer hardware system typically connected by a wide area or local area network to transmit data, receive data, and store (either ephemerally or permanently) said data in conjunction with its programming Computing device may also perform business logic, calculations, and present data by various media.

Delayed settlement: merchants have to settle transactions within a specific amount of time after authorization to avoid interchange downgrades (i.e., increases in interchange fees). The maximum period varies for everyone and is determined by industry, transaction type, channel used, and more.

Digital storage medium: is any data repository able to save non-transitory information. This is typically or more hard drives operable by a relational database.

EDI: Electronic Data Interchange.

EFT: Electronic Funds Transfer.

Electronic Remittance Advice (ERA): Any of several electronic formats for explaining the payments of health care claims.

Enhanced Data: Additional data submitted by a merchant through a credit card network that typically lowers the interchange rate incurred for the transaction. Enhance data includes sales tax breakdown, customer references, merchant order numbers, transportation information, hotel accommodation information, car rental data, product codes, item descriptions, item quantities, item units, discount amounts, shipping information and the like. This additional data is known as Level II and Level II data.

Explanation of benefits (EOB): is a statement typically sent by a health insurance entity explaining what medical services were covered under an insurance policy. An EOB will typically include a summary of the services performed, the medical provider's fee and the amount a patient is responsible for.

Fax: is short for facsimile. It is a method of sending image data across the standard phone line to another fax machine. It is considered by many service providers a relatively secure means of transmitting and receiving sensitive financial and medical information.

First Payment: is the initial transaction made by the card processor to the service provider using a virtual card payment which. The processing of that transactions enables the card processor to capture information necessary to make subsequent payments directly to the acquirer of the service provider thereby avoiding the need to generate virtual card payments and have those payments manually processed by the service provider.

FTP: (file transfer protocol) is an Internet protocol is used to copy files between computers—usually a client and an archive site. For the purposes of this application this includes encrypted variants such as Explicit FTPS, SSH File Transfer Protocol and tunneling a normal FTP session over an SSH connection.

Gateway: provides connectivity and security for cash register and point of sale (POS) interfaces. Gateways connect POS systems (card present, ecommerce, and mobile) to the various processors. Gateways store and transfer sensitive card data per the stringent rules and regulations that govern those processes.

Health Care Claim: refers to an electronic transition standard code 837 as defined by X12. Variants of the 837 code include 837i for institutional health care claims; 837p for professional health care claims; and 837d for dental health care claims.

Health Care Claim Payment (835): refers to an electronic transition standard code 835 as defined by X12 for a health care claim payment and remittance advice.

HTTP: (hypertext transfer protocol) is the protocol used to transmit and receive all data over the World Wide Web. HTTPS is a secure variant of HTTP.

IIN: a six-digit Issuer Identification Number (IIN) (also known as the "Bank Identification Number" (BIN)) the first digit of which is the Major Industry Identifier (MII).

Independent Sales Organization (ISO): A company or individual contracted with a payment card processor or acquirer to acquire new merchants. Many ISOs provide customer support, technical support and installation support to its customers on behalf of the acquirer.

Interchange Fee: the fee paid between banks for the acceptance of credit and/or debit card based transactions. The interchange rate may be greater for certain transactions including, but not limited, those wherein the physical card is not present at the point-of-sale card terminal.

Issuing Bank: the bank that issues a credit, debit or stored value card to a consumer. This may be synonymous with the card processor in the context of the current claims. This is typically the cardholder's financial institution but in the case of a payment processor, the issued cards may be that of the processor.

Loop Routine: a logical programming loop such as a while . . . or for statement that repeats a set of operations until the loop has iterated through an array of possible acquiring processors or a specific condition has been met (e.g., a successful payment transaction has been acknowledged by the most recent targeted acquiring processor).

Message: generally means an object of communication or vessel which provides information.

Payee: is the recipient of the payment card funds. In health care, this may be the service provider (e.g., physician's office). For automobile warranties, this may be the mechanic or service department. For travel, the payee may be a hotel, airline or the traveler whose itinerary is often managed on his or her behalf.

Payor. In health care, an entity that assumes the risk of paying for medical treatments. This can be an uninsured patient, a self-insured employer, or a health care plan or HMO. Payor may also be used in other industries such as automobile warranty claims and travel services (such as paying for an employee's hotel room or airline ticket).

Payment Card: refers to any credit card, debit card, stored value card or the like.

Payment Receipt: refers to a transmission made by fax, email, or the like confirming that a direct payment has been made from the card processor to the acquirer for the service provider's merchant account. The payment receipt may be a merger of an authorization code, amount paid, date of payment, payer identity and an explanation of benefits into a single file or document.

Personal Information: information that can be used to uniquely identify, contact, or locate a single person or can be used with other sources to uniquely identify a single individual.

Personal Identification Number (PIN): A number used by a cardholder to authorize card payments. A PIN debit is a debit card transaction authorized by the cardholder using a personal identification number.

PCI DSS: is an acronym for the payment card industry data security standard. PCI DSS is a security standard for organizations that handle cardholder information.

Second Payment: is made by the card processor directly to the acquirer of the service provider's merchant account. This avoids the need to have the service provider manually process a virtual card payment.

Service Provider: refers to the entity that provides services to be paid for. Service providers applicable to the current invention may include, but are not limited to, construction contractors, vehicle repair shops, pharmacies and medical service providers.

SMS: (short message service) is a wireless technology for sending short text messages between mobile phones, fax machines, and IP addresses. It's similar to paging, except that the recipient's phone doesn't need to be active; instead, the message is stored.

SMTP: Simple Mail Transfer Protocol is used to send email. The SMTP protocol provides a common language for different servers to send and receive email messages. The default TCP/IP port for the SMTP protocol is port 25.

Standard Industrial Classification (SIC) code: is a United States government system for classifying industries by a four-digit code. This is also known as a Merchant Category Code (MCC).

Storage Device: is an electronic storage medium such as a hard drive, hard drive array, solid state memory, magnetic tape, and optical drives.

Stored Value Card: are those payment cards (in tangible or virtual form) which have a monetary value stored on them. Whereas the prepaid credit card can only be used with authorization from the cardholder, the stored value cards have an anonymous aspect. Examples of stored-value cards include the well-known telephone cards, merchant gift cards, or prepaid debit cards.

Structural Warranty: an insurance policy against a physical structure such as a house, commercial building, or non-habitable structure (e.g., wall, road, or other physical facility).

Switch: is a software that takes a standardized transaction message and reformats it based on the transaction type and the end processor which it is delivered.

Travel Management Account: is a service provided to companies by a third party administrator to manage and pay employees for business-related travel expenses.

Virtual Payment Card: are payment cards that are generated electronically and not reduced to a physical plastic card. Virtual payment cards may be processed by a service provider as a CNP transaction or the data may be transmitted directly to the card acquirer for the service provider which in such case the CNP designation may or may not be included.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of electronically processing a card payment to a payee that bypasses a card terminal of the payee and sends payment to an acquirer processor of the payee, the method comprising the steps of:
   establishing an electronic connection between a payment gateway and plurality of acquirer processors;

accessing an array of operational parameters for each individual acquirer processor wherein generic payment instructions are translatable to the operational parameters of each individual acquirer processor;

receiving a first generic payment instruction to make a virtual card payment from a payor to the payee, wherein an identity of the acquirer processor associated with the payee is unknown, the virtual card being generated electronically and not reduced to a physical plastic card;

selecting a first target acquirer processor from the plurality of acquirer processors as a first candidate for the payee's unknown acquirer processor;

automatically translating the first generic payment instruction to the operational parameters of the first target acquirer processor;

electronically sending the translated payment instruction to the first target acquirer processor through the payment gateway;

receiving an exception from the first target acquirer processor indicating the attempted payment instruction was not successfully processed;

responsive to receiving the exception, eliminating the first target acquirer processor as a potential candidate for the payee's unknown acquirer processor;

selecting a second target acquirer processor from the plurality of acquirer processors as a second candidate for the payee's unknown acquirer processor;

retranslating the first generic payment instruction to the operational parameters of a second target acquirer processor; and sending the retranslated payment instruction to the second target acquirer processor through the payment gateway;

responsive to receiving subsequent exceptions, selecting successive target acquirer processors from the plurality of target acquirer processors as successive candidates for the payee's unknown acquirer processor; and retranslating the first generic payment instruction for each successive target acquirer processor until the gateway receives a response that the first generic payment instruction has been successfully processed.

2. The method of claim 1 further comprising the step of establishing a pinging table, the table containing business logic and data to automatically order the sequence of acquirer processors to target wherein the business logic and data are selected from the group consisting of merchant identification, industry specification and merchant history.

3. The method of claim 1 further comprising the steps of establishing a merchant-acquirer database communicatively coupled to the gateway;

saving to the merchant-acquirer database the merchant and acquirer coupling that resulted in the response that the payment instruction has been successfully processed; and upon receiving a subsequent generic payment instruction for the merchant, retrieving from the merchant-acquirer database the associated acquirer processor and targeting the associated acquirer processor for the first attempt using the operational parameters for the associated acquirer processor.

4. The method of claim 1 wherein the payment sent is for an adjudicated claim against insurance and responsive to the gateway receiving the response that the payment instruction was successfully processed automatically transmitting to the payee remittance advice describing what was paid of the adjudicated claim and the amount that was paid to the payee.

5. The method of claim 4 wherein the automatic transmission of the remittance advice and amount is sent by fax.

6. The method of claim 1 wherein the payment sent is for an adjudicated claim against a vehicle warranty and responsive to the gateway receiving the response that the payment instruction was successfully processed automatically transmitting to the payee remittance advice describing what was paid of the adjudicated claim and the amount that was paid to the payee.

7. The method of claim 1 wherein the payment sent is for an adjudicated claim against a structural warranty and responsive to the gateway receiving the response that the payment instruction was successfully processed automatically transmitting to the payee remittance advice describing what was paid of the adjudicated claim and the amount that was paid to the payee.

8. The method of claim 1 wherein the payment sent is for an adjudicated claim against a health insurance policy and responsive to the gateway receiving the response that the payment instruction was successfully processed automatically transmitting to the payee remittance advice describing what was paid of the adjudicated claim and the amount that was paid to the payee.

9. The method of claim 1 wherein the payment sent is for an adjudicated claim against a travel management account and responsive to the gateway receiving the response that the payment instruction was successfully processed automatically transmitting to the payee remittance advice describing what was paid of the adjudicated claim and the amount that was paid to the payee.

10. A system for electronically processing a card payment to a payee that bypasses a card terminal of the payee and sends payment to an acquirer processor of the payee, the system comprising:

a payment gateway application communicatively coupled to a plurality of acquirer processors;

a data store holding an array of operational parameters for each individual acquirer processor wherein generic payment instructions are translatable to the operational parameters of each individual acquirer processor;

an electronic interface that receives a first generic payment instruction to make a virtual card payment from a payor to the payee, wherein an identity of the acquirer processor associated with the payee is unknown and the virtual card is generated electronically and not reduced to a physical plastic card;

a selection routine configured to select a first acquirer processor from the plurality of acquirer processors as a first candidate for the unknown acquirer processor associated with the payee;

a software logic routine communicatively coupled to the graphic user interface and the payment gateway, the routine automatically translates the first generic payment instruction to the operational parameters of a first target acquirer processor;

an electronic transmission routine to send the translated payment instruction to the first target acquirer processor through the payment gateway;

an electronic receipt routine to receive an exception from the first target acquirer processor indicating the attempted payment instruction was not successfully processed, whereby the selection routine eliminates the first target acquirer processor as a potential candidate for the payee's unknown acquirer processor and selects a second acquirer processor from the plurality of acquirer processors as a second candidate for the unknown acquirer processor associated with the payee; and a loop routine that retranslates the first generic payment instruction to the operational parameters of the second target acquirer processor and then sends the retranslated payment instruction to the second target acquirer processor through the payment gateway wherein the loop routine retranslates the first generic payment instruction for each successive target acquirer processor selected by the selection routine until the gateway receives a response that the payment instruction has been successfully processed.

11. The system of claim 10 wherein the electronic interface is a web service.

12. The system of claim 10 wherein the electronic interface is a remotely accessible graphic user interface.

13. The system of claim 10 further comprising a pinging table communicatively coupled to the gateway, the table accessing business logic and data to automatically order the sequence of acquirer processors to target wherein the business logic and data are selected from the group consisting of merchant identification, industry specification and merchant history.

14. The system of claim 10 further comprising a merchant-acquirer database communicatively coupled to the gateway wherein the merchant and acquirer coupling that resulted in the response that the payment instruction has been successfully processed are saved to the database and upon receiving a subsequent generic payment instruction for the merchant, the gateway is capable of retrieving from the merchant-acquirer database the associated acquirer processor and targeting the associated acquirer processor for the first attempt using the operational parameters for the associated acquirer processor.

\* \* \* \* \*